United States Patent
Sorrentino

(10) Patent No.: US 8,750,230 B2
(45) Date of Patent: Jun. 10, 2014

(54) METHODS AND APPARATUSES FOR HANDLING REFERENCE SIGNALS IN A CELLULAR NETWORK

(75) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 96 days.

(21) Appl. No.: 13/389,712

(22) PCT Filed: Dec. 22, 2011

(86) PCT No.: PCT/SE2011/051583
§ 371 (c)(1),
(2), (4) Date: Feb. 9, 2012

(87) PCT Pub. No.: WO2013/025140
PCT Pub. Date: Feb. 21, 2013

(65) Prior Publication Data
US 2013/0039285 A1    Feb. 14, 2013

Related U.S. Application Data

(60) Provisional application No. 61/522,858, filed on Aug. 12, 2011.

(51) Int. Cl.
*H04W 72/04*    (2009.01)
*H04L 27/26*    (2006.01)

(52) U.S. Cl.
CPC .................................. *H04L 27/2613* (2013.01)
USPC ............................ 370/329; 370/310; 370/328

(58) Field of Classification Search
None
See application file for complete search history.

(56) References Cited

U.S. PATENT DOCUMENTS

| 2008/0051125 | A1* | 2/2008 | Muharemovic et al. | 455/519 |
| 2008/0080467 | A1* | 4/2008 | Pajukoski et al. | 370/342 |
| 2010/0034312 | A1* | 2/2010 | Muharemovic et al. | 375/267 |
| 2010/0067613 | A1* | 3/2010 | Park et al. | 375/295 |
| 2011/0200002 | A1* | 8/2011 | Han et al. | 370/329 |
| 2011/0249648 | A1* | 10/2011 | Jen | 370/330 |

(Continued)

FOREIGN PATENT DOCUMENTS

| EP | 2 375 616 A1 | 10/2011 |
| WO | 2010047512 A2 | 4/2010 |
| WO | WO2011084004 | * 7/2011 |

OTHER PUBLICATIONS

Ericsson, Potential Enhancements for UL DMRS, Oct. 10-14, 2011, R1-113494.*

(Continued)

*Primary Examiner* — Hassan Kizou
*Assistant Examiner* — Tejis Daya
(74) *Attorney, Agent, or Firm* — Coats and Bennett, P.L.L.C.

(57) ABSTRACT

Methods and apparatuses for enabling a configured demodulation reference signal to be transmitted from a User Equipment, UE, (202) when served by a base station (200) in a cellular network. The base station sends (2:3) at least one configuration parameter to the UE, which indicates a UE-specific base sequence and/or a UE-specific cyclic shift hopping pattern assigned (2:2) to the UE. The UE then uses the configuration parameters to generate (2:4) and transmit (2:5) the demodulation reference signal based on the UE-specific base sequence and UE-specific cyclic shift hopping pattern. Thereby, orthogonality can be achieved between the transmitted demodulation reference signal and any demodulation reference signals transmitted by other UEs, by using separate UE-specific base sequences and/or UE-specific cyclic shift hopping patterns.

22 Claims, 2 Drawing Sheets

(56) References Cited

U.S. PATENT DOCUMENTS

| | | | |
|---|---|---|---|
| 2013/0039387 A1* | 2/2013 | Qu | 375/141 |
| 2013/0114514 A1* | 5/2013 | Nissila et al. | 370/329 |
| 2013/0114523 A1* | 5/2013 | Chatterjee et al. | 370/329 |

OTHER PUBLICATIONS

Panasonic, Cell Specific Cyclic Shift Hopping v.s. UE specific Cyclic Shift Hopping for Uplink ACK/NACK Signals, Aug. 20-24, 2007, R1-073619.*

Qualcomm, Remaining Issues on UL Hopping, Apr. 4, 2008, R1-081478.*

International search report, International application No. PCT/SE2011/051583. Date of mailing: Apr. 12, 2012. European Patent Office, Rijswijk, Netherlands.

3GPP. "Cell Specific Cyclic Shift Hopping v.s. UE Specific Cyclic Shift Hopping for Uplink ACK/NACK signals." 3GPP Draft; R1-073619. Aug. 2007. 3GPP, Sophia-Antipolis, France.

3GPP. "Potential Enhancements for DMRS in Rel-11." 3GPP Draft; R1-112086. Aug. 2011. 3GPP, Sophia-Antipolis, France.

3GPP. "Standardization Support for UL CoMP." 3GPP Draft; R1-112426. Aug. 2011. 3GPP, Sophia-Antipolis, France.

3GPP. "UL reference signal enhancements." 3GPP Draft; R1-112907. Oct. 2011. 3GPP, Sophia-Antipolis, France.

3GPP. "Potential Enhancements for UL DMRS." 3GPP Draft; R1-113494. Oct. 2011. 3GPP, Sophia-Antipolis, France.

3GPP TSG-RAN Meeting #64. Taipei, Taiwan, Feb. 21-25, 2011. "Corrections to Rel-10 LTE-Advanced features in 36.211." 36.211 CR 0150. v.10.0.0. R1-111214. 3GPP, Sophia-Antipolis, France.

3GPP TSG-RAN Meeting #64. Taipei, Taiwan, Feb. 21-25, 2011. "Corrections to Rel-10 LTE-Advanced features in 36.212." 36.212 CR 0102. R1-111215. 3GPP, Sophia-Antipolis, France.

3GPP TSG-RAN Meeting #64. Taipei, Taiwan, Feb. 21-25, 2011. "Corrections to Rel-10 LTE-Advanced features in 36.213." 36.213 CR 0273 v.10.0.1 R1-111216. 3GPP, Sophia-Antipolis, France.

* cited by examiner

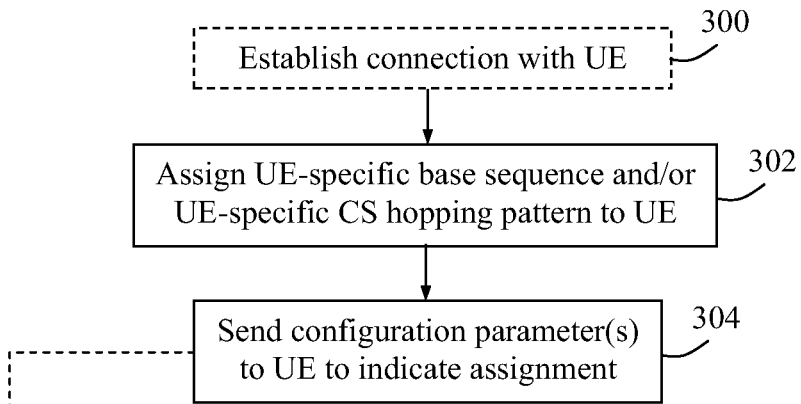
Fig. 3 [Method in base station]
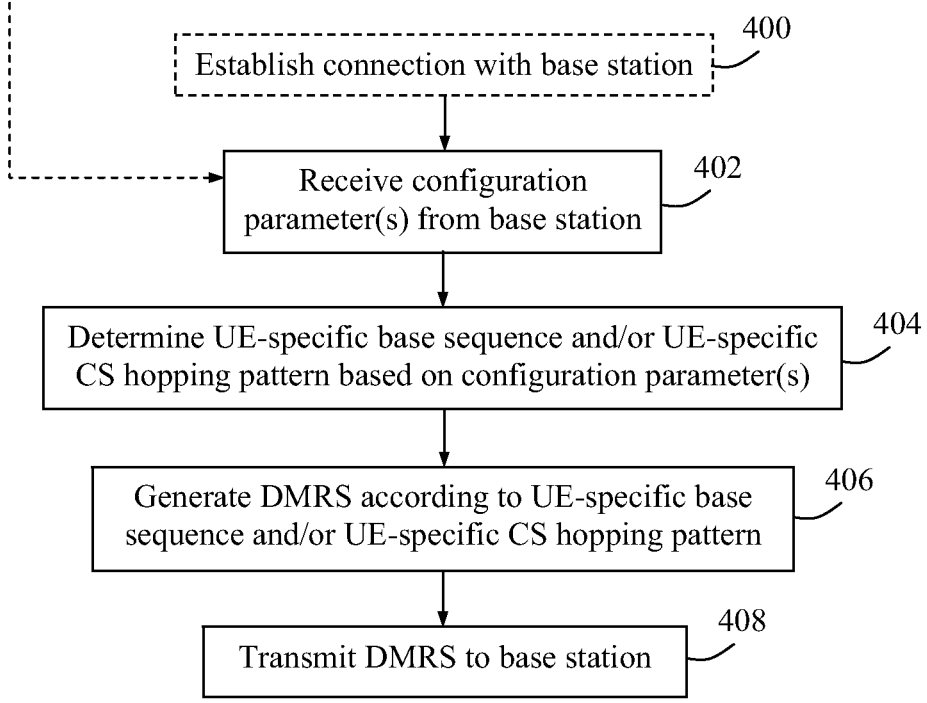
Fig. 4 [Method in UE]

METHODS AND APPARATUSES FOR HANDLING REFERENCE SIGNALS IN A CELLULAR NETWORK

TECHNICAL FIELD

The present disclosure relates generally to methods and apparatuses for handling demodulation reference signals to be transmitted from a User Equipment, UE, to a base station in a cellular network.

BACKGROUND

In cellular networks for radio communication with user controlled terminals, commonly referred to as User Equipments, UEs, interference may occur between different transmissions made at the same time and on the same frequency band. For example, in order to increase capacity in networks employing Long Term Evolution, LTE, so-called co-scheduling is enabled for uplink transmissions of signals from multiple UEs in a cell where the UEs in the cell can be scheduled to transmit basically at the same time and on the same bandwidth, by using more or less orthogonal signals. The term "orthogonal" implies that the signals are basically non-interfering with each other. Still, interference typically occurs for data signals to some extent, both between co-scheduled UEs in the same cell and between UEs in different cells, since it is not always possible to make simultaneous transmissions from different UEs completely orthogonal, either within a cell or between neighbouring cells. Data signals are typically transmitted on a Physical Uplink Shared Channel, PUSCH.

Some examples of network scenarios where interference can potentially occur include when UEs are located close to the cell border or "cell-edge", when large cells are divided into multiple adjacent sectors, when pico-cells are deployed within the coverage of a macro-cell, and when a hotspot access point serves a small area with high data throughput. FIG. 1 illustrates an example with two neighbouring cells, a first cell A and a second cell B, with radio coverage by a first base station 100A and a second base station 100B, respectively. In the first cell A, a first UE 102 and a second UE 104 transmit respective uplink data signals x and y simultaneously on a shared bandwidth, which may thus interfere with each other when received by the first base station 100A. The figure also illustrates that a third UE 106 in the second cell B transmits an uplink data signal z on the same bandwidth, which may be interfered by the transmission from the second UE 104 when received by the second base station 100B, as indicated by a dashed arrow y'.

Typically, an interfering data signal such as y' is a disturbance that makes it difficult to detect the interfered data signal z properly at the second base station 100B, although solutions have been developed for data signals where the interfering signal y' is transformed into a useful signal by base station 100B for decoding the data signal y coming from UE 102 in base station 100A. In general, LTE networks can be designed to use Coordinated Multipoint Processing, CoMP, where base stations of different cells and/or sectors operate in a coordinated way for detection of data signals and scheduling. An example of uplink CoMP is when a data signal transmitted from a single UE is received and jointly processed at multiple reception points, e.g. base stations, in order to improve the link quality.

In this context, the receiving base station may have functionality to estimate the uplink radio channel used by a transmitting UE, to support and facilitate signal demodulation and detection on that channel, e.g. PUSCH. To this end, the UE sends a reference signal known as the "Demodulation Reference Signal", DMRS, that the base station can use for performing channel estimation. The channel estimation is then employed by an equalizer in the base station for demodulation of received uplink data transmissions, e.g. on the PUSCH. The DMRS is thus typically associated to the PUSCH used. In LTE, a radio frame scheme with 10 subframes of two slots each is used, and two DMRSs are typically transmitted in a subframe, with one DMRS in each slot. The DMRS has the same bandwidth as PUSCH and may be precoded in the spatial domain in a similar way as data transmitted on the PUSCH. Achieving orthogonality of DMRS transmissions from co-scheduled UEs will allow for improved accuracy of the channel estimation. The equalizer in the receiving base station is then able to separate, e.g. using multi-antenna techniques, the co-scheduled DMRS transmissions, and even to suppress interference at the base station's receiver.

However, DMRSs transmitted at the same time from different UEs may potentially interfere with each other, either within a cell or between neighbouring cells, e.g. as explained above. Different techniques have been introduced in different releases of LTE to achieve orthogonal or "semi-orthogonal" DMRSs, thus limiting the level of interference between them to allow accurate channel estimation. It is typically assumed in LTE that DMRS transmissions from different UEs should be orthogonal within each cell and semi-orthogonal between neighbouring cells. As a result, a DMRS transmitted in one cell may be interfered by a semi-orthogonal DMRS transmitted at the same time in a neighbouring cell, thus disturbing the channel estimation in the former cell.

A DMRS can be defined by a base sequence and a cyclic time shift of the base sequence such that the DMRS to be transmitted is generated as a function of said base sequence and based on the applied cyclic time shift in a manner well-known in this field. According to releases 8, 9 and 10 of LTE, the base sequence of a DMRS is cell-specific by being a function of the cell identity, as well as other cell-specific parameters. Further, some DMRSs generated from different base sequences of different cells can be considered semi-orthogonal when transmitted simultaneously. The base sequences employed in LTE can be chosen based on various properties, e.g. the so-called low cross-correlation absolute value between different base sequences. Because of this property, using different base sequences for DMRSs can cause relatively low mutual interference from the DMRSs, even without being perfectly orthogonal, hence the term "semi-orthogonal" which corresponds to the sometimes used term "pseudo-orthogonal".

DMRSs generated from the same cell-specific base sequence can be made orthogonal by applying different cyclic time shifts on that base sequence to provide circular rotation in the time domain, which method is often referred to simply as "CS", and is used in LTE where there are currently 12 different CS values available. Even though CS with cyclic time shift is effective for limiting interference between simultaneously transmitted DMRSs used for channels with completely overlapping bandwidths, full orthogonality can be lost when the channel bandwidths differ and/or when UEs employ different base sequences. So-called "CS hopping" is another method that can be used for reducing the impact of interference between simultaneous DMRS transmissions, where the CS value is changed over time according to a hopping pattern which is configured per cell.

It is generally useful to spread out and "randomize" the interference to limit its impact on link quality. In order to increase interference randomization, a pseudo-random offset is applied to the CS values when using the CS hopping method. A different CS offset is usually applied in each slot and this CS offset is known at both the UE and the base station, so that the CS offset can be compensated at the receiving side during channel estimation. The pseudo-random CS offset is combined with a signaled CS offset for each slot, and a "modulo 12" operation is performed in order to avoid exceeding the maximum CS value of 12. Typically, CS randomization is always employed and generates random cell-specific CS offsets per slot. The pseudo-random CS pattern to use is determined by a function of the cell-ID and other cell-specific parameters.

In LTE release 10, cyclic time shift is used in conjunction with a method known in the art called Orthogonal Cover Codes, OCC, which is a multiplexing technique where different orthogonal time domain codes are applied on the two DMRSs transmitted in an uplink subframe. For example, a first OCC code denoted [1-1] can be applied on one DMRS transmission to suppress another interfering DMRS transmission as long as its contribution after passing through a matched filter in the base station is identical on both DMRSs of the same subframe. Similarly, a second OCC code denoted [1 1] is able to suppress an interfering DMRS provided that its contribution after the matched filter has an opposite sign respectively on the two DMRSs of the same subframe. Virtually full orthogonality between two UEs can thus be achieved by applying different OCC codes on their DMRS transmissions only if the same base sequence is used on the DMRS in both slots by each UE.

However, as the above-mentioned network scenarios are sensitive to interference and will be more commonly deployed, and as CoMP will be extensively used for uplink transmissions, the requirements for effective channel estimation will become even greater to achieve acceptable link quality. It is thus a problem that the interference between DMRSs cannot be limited sufficiently in situations of dense traffic and/or closely located UEs.

SUMMARY

It is an object of the solution described herein to address at least some of the problems and issues outlined above. It is possible to achieve these objects and others by using methods and apparatuses as defined in the attached independent claims.

According to one aspect, a method is provided in a base station for enabling a User Equipment, UE, to transmit a configured demodulation reference signal, DMRS, when being served by the base station. In this method, the base station assigns at least one of a UE-specific base sequence and a UE-specific cyclic shift hopping pattern to the UE. The base station then sends at least one configuration parameter to the UE, which configuration parameters indicate the assigned at least one of the UE-specific base sequence and UE-specific cyclic shift hopping pattern. Thereby, the UE is enabled to use the received configuration parameters to generate and transmit the demodulation reference signal based on the at least one of the UE-specific base sequence and UE-specific cyclic shift hopping pattern.

According to another aspect, a base station is provided that is adapted to enable a User Equipment, UE, to transmit a configured demodulation reference signal, DMRS, when being served by the base station. The base station comprises a configuration circuit adapted to assign at least one of a UE-specific base sequence and a UE-specific cyclic shift hopping pattern to the UE. The base station also comprises a transceiver circuit adapted to send at least one configuration parameter to the UE, which configuration parameters indicate the assigned at least one of the UE-specific base sequence and UE-specific cyclic shift hopping pattern, to enable the UE to use those configuration parameters to generate and transmit the demodulation reference signal based on the at least one of the UE-specific base sequence and UE-specific cyclic shift hopping pattern.

According to another aspect, a method is provided in a User Equipment, UE, for creating a demodulation reference signal, DMRS, for transmission when being served by a base station. In this method, the UE receives at least one configuration parameter from the base station, which configuration parameters indicate at least one of a UE-specific base sequence and a UE-specific cyclic shift hopping pattern. The UE then generates the demodulation reference signal based on the at least one of the UE-specific base sequence and the UE-specific cyclic shift hopping pattern, and transmits the generated demodulation reference signal.

According to another aspect, a User Equipment, UE, is provided that is adapted to create a demodulation reference signal, DMRS, for transmission when being served by a base station. The UE comprises a transceiver circuit adapted to receive at least one configuration parameter from the base station, which configuration parameters indicate at least one of a UE-specific base sequence and a UE-specific cyclic shift hopping pattern. The UE also comprises a control circuit adapted to generate the demodulation reference signal according to the at least one of the UE-specific base sequence and the UE-specific cyclic shift hopping pattern. The transceiver circuit is further adapted to transmit the generated demodulation reference signal.

The above methods and apparatuses in the base station and the UE may be configured and implemented according to different optional embodiments. In one possible embodiment, the at least one of a UE-specific base sequence and a UE-specific cyclic shift hopping pattern substitutes at least one of a default cell-specific base sequence and a default cell-specific cyclic shift hopping pattern configured in the UE.

In another possible embodiment, the at least one configuration parameter comprises at least one of a UE-specific base sequence parameter $\Delta_{SS,UE}$ which the UE can use for determining the UE-specific base sequence, and a UE-specific cyclic shift hopping parameter $\Delta_{CS,UE}$ which the UE can use for determining the UE-specific cyclic shift hopping pattern. If the UE-specific base sequence is defined by a modified sequence shift pattern $f_{SS,UE}^{PUSCH}$ for a PUSCH channel and the UE-specific cyclic shift hopping pattern is defined by a modified cyclic shift random generator initialization parameter $c_{initi,UE}$, the modified sequence shift pattern $f_{SS,UE}^{PUSCH}$ may be determined based on the UE-specific base sequence parameter $\Delta_{SS,UE}$, and the modified cyclic shift random generator initialization parameter $c_{initi,UE}$ may be determined based on the UE-specific cyclic shift hopping parameter $\Delta_{CS,UE}$.

According to different possible embodiments, the above modified sequence shift pattern $f_{SS,UE}^{PUSCH}$ and the above modified cyclic shift random generator initialization parameter $c_{initi,UE}$ may be determined as:

$$f_{SS,UE}^{PUSCH} = (f_{SS}^{PUCCH} + \Delta_{SS} \Delta_{SS,UE}) \bmod 30, \text{ and}$$

$$c_{initi,UE} = \text{floor}(N_{ID}^{cell}/30)*2^5 + (f_{SS}^{PUSCH} + \Delta_{CS,UE}) \bmod 30,$$

where $\Delta_{SS}$ is a predefined cell-specific parameter, $f_{SS}^{PUSCH}$ is a default sequence shift pattern for a PUSCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

Alternatively, the above modified sequence shift pattern $f_{SS,UE}^{PUSCH}$ and the above modified cyclic shift random generator initialization parameter $c_{initi,UE}$ may be determined as:

$$f_{SS,UE}^{PUSCH} = (f_{SS}^{PUCCH} + \Delta_{SS,UE}) \bmod 30, \text{ and}$$

$$c_{initi,UE} = \text{floor}(N_{ID}^{cell}/30) * 2^5 \Delta_{CS,UE},$$

where $f_{SS}^{PUCCH}$ is a default sequence shift pattern for a PUCCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

In another possible embodiment, Multiple-Input-Multiple Output, MIMO, is employed for transferring at least two data stream layers from the UE to the base station, and at least one of the UE-specific base sequence and the UE-specific cyclic shift hopping pattern is assigned to each of the at least two data stream layers. The at least one of the UE-specific base sequence and the UE-specific cyclic shift hopping pattern may further be assigned to a group of UEs connected to the base station.

Further possible features and benefits of this solution will become apparent from the detailed description below.

BRIEF DESCRIPTION OF THE DRAWINGS

The solution will now be described in more detail by means of exemplary embodiments and with reference to the accompanying drawings, in which:

FIG. 3 is a flow chart illustrating a procedure in a base station, according to further possible embodiments.

FIG. 4 is a flow chart illustrating a procedure in a UE, according to further possible embodiments.

DETAILED DESCRIPTION

Figure 1:
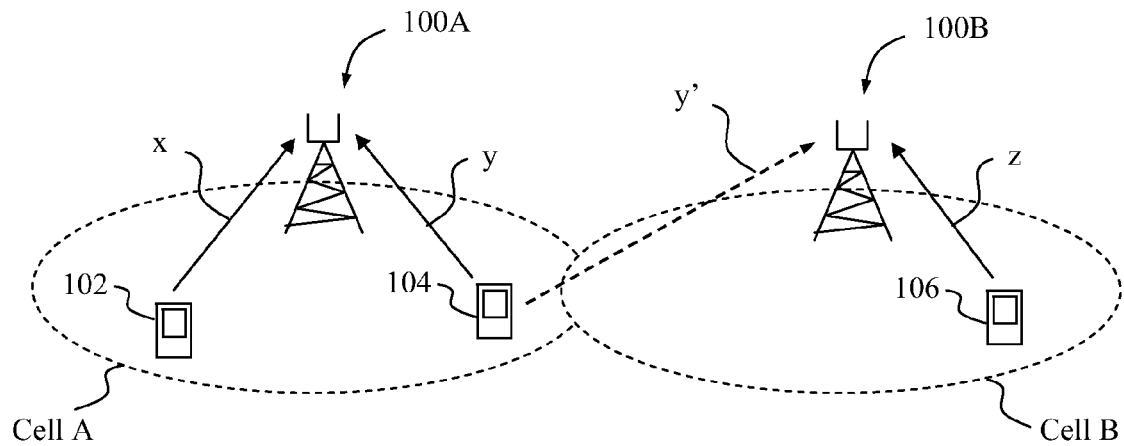
FIG. 1 is a communication scenario illustrating generally how interference can occur between UE transmissions.

Briefly described, a solution is provided to achieve orthogonality between transmissions of demodulation reference signals from UEs in different cells as well as within the same cell. As mentioned above, It is a problem that the interference between DMRSs cannot be limited sufficiently in situations of dense traffic and/or closely located UEs. For example, a small cell radius of a pico-cell and overlapping radio coverage with a macro-cell may result in potentially strong interference between UEs transmitting DMRSs simultaneously in respective cells. Further, densification of cells, increased number of receive antennas, and CoMP processing emphasize the need for orthogonality between simultaneous DMRS transmissions, even in different cells. According to Rel-10 LTE, such orthogonality can be achieved by use of OCC when the UEs are configured with the same cell-specific base sequence, although OCC is not effective when different CS hopping patterns are used by different UEs. In the scenarios described above, configuring several neighboring cells with the same base sequence would thus result in increased interference even from UEs located relatively far away.

It is thus a problem that the current known solutions outlined above do not provide for sufficient orthogonality between simultaneous DMRS transmissions on the same bandwidth in different cells, particularly when the traffic is dense, which degrades the quality of channel estimation on the transmitted DMRSs. For example, when two UEs in different cells are configured with different cell-specific base sequences, as in LTE, it is not possible to make their DMRS transmissions orthogonal according to the current known solutions. Using the CS method is not effective due to the use of different cell-specific base sequences in different cells, and not even the OCC method is effective due to the use of cell-specific CS hopping patterns in different cells.

A solution to one or more of the above problems and issues will now be be explained in terms of some exemplifying embodiments. In the following, a demodulation reference signal will be called DMRS for short. The orthogonality can be achieved if the base station to which a UE is connected assigns to the UE a UE-specific base sequence, or a UE-specific CS hopping pattern, or both, and sends at least one configuration parameter to the UE to indicate the assigned UE-specific base sequence and/or UE-specific CS hopping pattern. The UE is then able to use these configuration parameters to generate and transmit the DMRS based on the assigned UE-specific base sequence and/or UE-specific CS hopping pattern. As mentioned above, the DMRS to be transmitted by the UE is generated as a function of the applied base sequence and based on the applied cyclic time shift in a manner well-known in this field.

Thus, this solution introduces UE-specific configuration of the DMRS generated by base sequence and CS hopping pattern, instead of the previously employed cell-specific configuration of the DMRS. For example, a default cell-specific configuration of at least one of the base sequence and CS hopping pattern may have been pre-configured in the UE, and the UE-specific configuration of at least one of the base sequence and CS hopping pattern indicated by the configuration parameters from the base station may then substitute the default cell-specific configuration.

By making the configuration of the DMRS UE-specific for different UEs in terms of base sequence and/or CS hopping pattern, the interference between transmissions of DMRSs received from the UEs in different cells and within the same cell can be minimized as they use different base sequences and/or CS hopping patterns for generating and transmitting the DMRSs. For example, if two UEs in the same cell or in neighbouring cells use the same base sequence but different CS hopping patterns, or the same CS hopping pattern but different base sequences, for generating DMRS, their DMRS transmissions will become at least "semi-orthogonal" since their DMRS transmissions would only interfere when both CS and base sequence coincide at the same time. Thereby, the channel estimation performed in the base station on a received DMRS can be accurate enough due to reduced interference between different DMRS transmissions, provided that this interference reduction is sufficient.

LTE supports Multiple-Input, Multiple-Output, MIMO, where multiple antennas are employed at the transmitting and receiving nodes to transmit and receive multiple streams of information. By exploiting the spatial dimension of the communication channel between two nodes, MIMO can be used to simultaneously transmit multiple data streams over the same carrier frequency. Thus, MIMO can enable higher spectral efficiency and higher data rates without increasing the bandwidth since MIMO can be used by different UEs to transmit simultaneously on different spatial layers using the same time and frequency resources. If the solution described herein is used for a UE when MIMO is employed for receiving at least two data stream layers from the UE, one possibility is to assign at least one of a UE-specific base sequence and a UE-specific CS hopping pattern to the DMRS associated to each of the data stream layers to make them mutually orthogonal or semi-orthogonal. Alternatively, the same base sequence and the same CS hopping pattern may both be assigned to all DMRS for all layers transmitted by a given UE, and orthogonality may then be achieved by using suitable combinations of CS and/or OCC.

Some examples of configuration parameters and how the UE-specific base sequence and/or UE-specific CS hopping pattern can be generated from those configuration parameters, will be outlined in the following description. The terminology such as base station and User Equipment, UE, should be considered non-limiting for this solution and does not imply a particular hierarchical relation between two nodes. In general, a "base station" may be a radio node in a mobile access network in a traditional sense. However, the base station in this description may also represent a wireless mobile device 1 and the "user equipment" could be considered as another wireless mobile device 2. It is assumed that device 1 and device 2 can communicate with each other over a radio channel. The following description refers mainly to transmission of DMRSs on the uplink (UL) of an LTE Rel-11 network, even though the described solution may be applied also for a corresponding procedure on the downlink (DL). The DMRSs may also be transmitted according to this solution from one device to another in a direct device-to-device communication.

With reference to the scenario shown in FIG. 2, a procedure involving a base station 200 and a UE 202 will now be described as a possible example of employing the solution. The base station 200 comprises a configuration circuit 200a and a transceiver circuit 200b, while the UE 202 comprises a control circuit 202b and a transceiver circuit 202a, which circuits are involved in this solution as follows. To mention a few examples, the base station 200 may be implemented in a Node B, Evolved Node B (e NodeB), or Base Station Subsystem (BSS). Further, the UE 202 may be, for example, a cellular phone, smart phone, tablet computer, laptop computer, or any other device capable of radio communication. The solution is thus not limited to the above examples of base stations and UEs. It should be noted that the base station 200 and the UE 202 may both have further circuits and components, not shown, needed for normal operations, which are outside the scope of this solution and thus not necessary to describe here.

A first action 2:1 illustrates that the UE 202 and the base station establish a radio connection, e.g. according to a regular procedure involving exchange of various common messages between the transceiver circuits 200b and 202a in the base station 200 and the UE 202, respectively. The procedure for establishing the connection is however outside the scope of this solution. When this solution comes into effect in the base station 200 and the UE 202, it can be assumed that this action has been duly completed. In another action 2:2, the configuration circuit 200a in the base station 200 assigns at least one of a UE-specific base sequence and a UE-specific CS hopping pattern to the UE.

Next, the transceiver circuit 200b sends one or more configuration parameters to the UE 202 in an action 2:3, where the configuration parameters are created to indicate the assigned UE-specific base sequence and/or UE-specific CS hopping pattern. Thereby, the UE 202 is enabled to use the configuration parameters to determine the assigned UE-specific base sequence and/or UE-specific CS hopping pattern, and to generate and transmit the DMRS based on the determined UE-specific base sequence and/or UE-specific CS hopping pattern. This solution does not exclude that any of the above configuration parameters may also be used for other configurations not described here, which are however outside the scope of this solution. Thus, in a following action 2:4, the control circuit 202b in UE 202 generates the DMRS based on the determined UE-specific base sequence and/or UE-specific CS hopping pattern, and the transceiver circuit 202a transmits the generated DMRS to the base station 200, in a further action 2:5, which is received by the transceiver circuit 200b.

The above one or more configuration parameters indicating the assigned UE-specific base sequence and/or UE-specific CS hopping pattern can be created in different ways. For example, the configuration parameters may comprise at least a UE-specific base sequence parameter $\Delta_{SS,UE}$ which the UE can use for determining the assigned UE-specific base sequence. Alternatively or additionally, the configuration parameters may comprise at least a UE-specific CS hopping parameter $\Delta_{CS,UE}$ which the UE can use for determining the assigned UE-specific CS hopping pattern. This solution does not exclude that other additional parameters, e.g. one or more cell-specific parameters, are used as well to determine the assigned UE-specific base sequence and/or UE-specific CS hopping pattern. For example, if a base sequence index is a function of a cell-ID and a parameter $\Delta_{SS}$, it would be sufficient if either of the cell-ID and the $\Delta_{SS}$ is made UE-specific in order to achieve a UE-specific base sequence.

The base sequence index for a particular slot is generally defined by a sequence-group number "u" and a sequence number "v". The sequence-group number u may be derived from a so-called sequence-shift pattern for DMRS, denoted $f_{SS,UE}^{PUSCH}$, if the so-called "group hopping" function, which is a base sequence randomization technique defined in LTE, is disabled. Otherwise, if the group hopping function is enabled, the sequence-group number u may be derived from a combination of the above sequence-shift pattern $f_{SS,UE}^{PUSCH}$ and a group hopping pattern denoted $f_{GH}(n_s)$, where $n_s$ indicates a slot index. The group hopping pattern $f_{GH}(n_s)$ may be dependent on a combination of cell-specific parameters and/or UE-specific parameters.

In one possible example of the solution, a pseudo random generator for the group hopping pattern $f_{GH}(n_s)$ is initialized according to a UE-specific parameter.

In another possible example of the solution, the pseudo random generator for the group hopping pattern $f_{GH}(n_s)$ is initialized according to a combination of UE-specific parameters and cell-specific parameters.

In a further possible example, the sequence shift pattern for DMRS $f_{SS,UE}^{PUSCH}$ is derived from another parameter denoted $f_{SS}^{PUCCH}$ where $f_{SS,UE}^{PUSCH}$ is a function of a combination of the parameter $f_{SS}^{PUSCH}$ and one or more UE-specific parameters and possibly also one or more cell-specific parameters. The parameter $f_{SS}^{PUCCH}$ is in turn a function of the cell ID in LTE, thus being cell-specific.

The above sequence shift pattern $f_{SS,UE}^{PUSCH}$ for DMRS can be determined as:

$$f_{SS,UE}^{PUSCH} = (f_{SS}^{PUCCH} + \Delta_{SS} + \Delta_{SS,UE}) \bmod X, \tag{1}$$

where $\Delta_{SS}$ is a predefined cell-specific parameter and $\Delta_{SS,UE}$ is a UE-specific parameter. One possibility is to assign a default value of zero to the parameter $\Delta_{SS,UE}$ during initialization thus allowing $f_{SS,UE}^{PUSCH}$ to take a default cell-specific value, until a new UE-specific value for $\Delta_{SS,UE}$ is assigned and signaled to the UE.

An equivalent functionality may be achieved by determining the sequence shift pattern $f_{SS,UE}^{PUSCH}$ for DMRS as:

$$f_{SS,UE}^{PUSCH} = (f_{SS}^{PUCCH} + \Delta_{SS,UE}) \bmod X, \tag{2}$$

where $\Delta_{SS,UE}$ is a UE-specific parameter having the initial cell-specific default value $\Delta_{SS}$.

Alternatively or additionally, the UE-specific CS hopping pattern may be defined by initializing the cyclic shift random generator in a UE-specific fashion. One possibility is to generate the CS hopping pattern according to a pre-defined pseudo random generator, whose output sequence can be fully determined by an initialization parameter of the random generator denoted $c_{initi,UE}$. In one possible example, the initialization parameter $c_{initi,UE}$ is a function of one or more UE-specific parameters and possibly one or more cell-specific parameters. Furthermore, either of the cell-specific and/or UE-specific parameters for the initialization of $c_{initi,UE}$ may be shared with the parameters determining the base sequence group number u and its sequence number v, such as the above-mentioned parameters $f_{SS,UE}^{PUSCH}$, $f_{SS}^{PUCCH}$, $\Delta_{SS}$, the cell identity and/or any other parameters employed for the configuration of the base sequence. The objective of configuring UE-specific CS hopping patterns may be achieved as long as at least one UE-specific parameter is involved in the initialization of the UE-specific CS hopping pattern generator.

A further possible example of how the UE-specific cyclic shift random generator initialization parameter $c_{initi,UE}$ can be calculated from the UE-specific base sequence is as follows:

$$c_{initi,UE} = \text{floor}(Y/X) * 2^5 + (Z + \Delta_{CS,UE}) \bmod X, \quad (3)$$

where Y and Z can be predefined cell-specific parameters and $\Delta_{CS,UE}$ is a UE-specific parameter. Further, "floor" is a truncation down to the nearest integer. Clearly, the objective of enabling UE-specific CS hopping randomization may be achieved even if the cell-specific parameter Z is omitted. Similarly, UE-specific configurations of the CS hopping pattern may be achieved by substituting Y with a UE-specific parameter.

In a further possible example, any of Y or Z can be substituted by a UE-specific parameter.

In another possible example, any of the parameters Y, Z or $\Delta_{CS,UE}$ can be derived from other UE specific parameters.

In a further possible example, any of the parameters Y, Z or $\Delta_{CS,UE}$ can be UE-specific parameters although they may have an initial default value that can be defined in a cell-specific fashion.

In (1), (2) and (3) above, X is the total number of available base sequences from which a base sequence can be selected for the UE, and "mod X" denotes a modulus operation with a base X. Currently, there are 30 different base sequences available in LTE, thus X=30.

Further, each of the configuration parameters $\Delta_{SS,UE}$ and $\Delta_{CS,UE}$ is an integer in the range of 0 ... (X−1). If there are 30 different available base sequences to choose from, as in the case of a typical LTE system, the configuration parameters $\Delta_{SS,UE}$ and $\Delta_{CS,UE}$ can be any integer in the range of 0 ... 29.

Another example of how the above modified sequence shift pattern $f_{SS,UE}^{PUSCH}$ and modified cyclic shift random generator initialization parameter $c_{initi,UE}$ can be calculated from the above configuration parameters $\Delta_{SS,UE}$ and $\Delta_{CS,UE}$ is given below:

$f_{SS,UE}^{PUSCH}$ can be calculated according to (2) above, and $$c_{initi,UE} = \text{floor}(N_{ID}^{cell}/X) * 2^5 + \Delta_{CS,UE} \quad (4)$$

where $N_{ID}^{cell}$ is the cell ID for cell N. Also in this case of using (2) and (4), X is the number of available base sequences, and each of the configuration parameters as $\Delta_{SS,UE}$ and $\Delta_{CS,UE}$ is an integer in the range of 0 ... (X−1), where X=30 in LTE.

In different variants of this solution, the control circuit 202b in UE 202 may thus be adapted to determine the assigned UE-specific base sequence and/or UE-specific CS hopping pattern by calculating the modified sequence shift pattern $f_{SS,UE}^{PUSCH}$ according to (1) or (2) above, and/or by calculating the modified cyclic shift random generator initialization parameter $c_{initi,UE}$ according to (3) or (4) above, from the configuration parameters $\Delta_{SS,UE}$ and $\Delta_{CS,UE}$ received in action 2:3, and to generate the DMRS in action 2:4 according to the determined UE-specific base sequence and/or UE-specific CS hopping pattern.

Furthermore, the UE 202 may have been configured with a default cell-specific base sequence and a default cell-specific CS hopping pattern for use when transmitting a DMRS. In that case, at least one of a UE-specific base sequence and a UE-specific CS hopping pattern, e.g. determined according to any of the embodiments described above, may substitute the default cell-specific base sequence and/or default cell-specific CS hopping pattern configured in the UE to make the transmitted DMRS UE-specific.

If multiple UEs are connected to the base station 200, the configuration circuit 200a may assign a UE-specific base sequence and/or a UE-specific CS hopping pattern to each of the connected UEs. Further, a UE-specific base sequence and/or a UE-specific CS hopping pattern may be assigned to a group of UEs connected to the base station, the group thus sharing the same base sequence and/or UE-specific CS hopping pattern. By configuring different base sequences for different groups of UEs, e.g., a group of UEs belonging to a macro- or pico-cell, and the same CS hopping pattern for all the UEs in all groups, it becomes possible to assign orthogonal DMRSs for UEs belonging to different groups and simultaneously maintain semi-orthogonality between UEs that are not separated by OCC.

Figure 2:
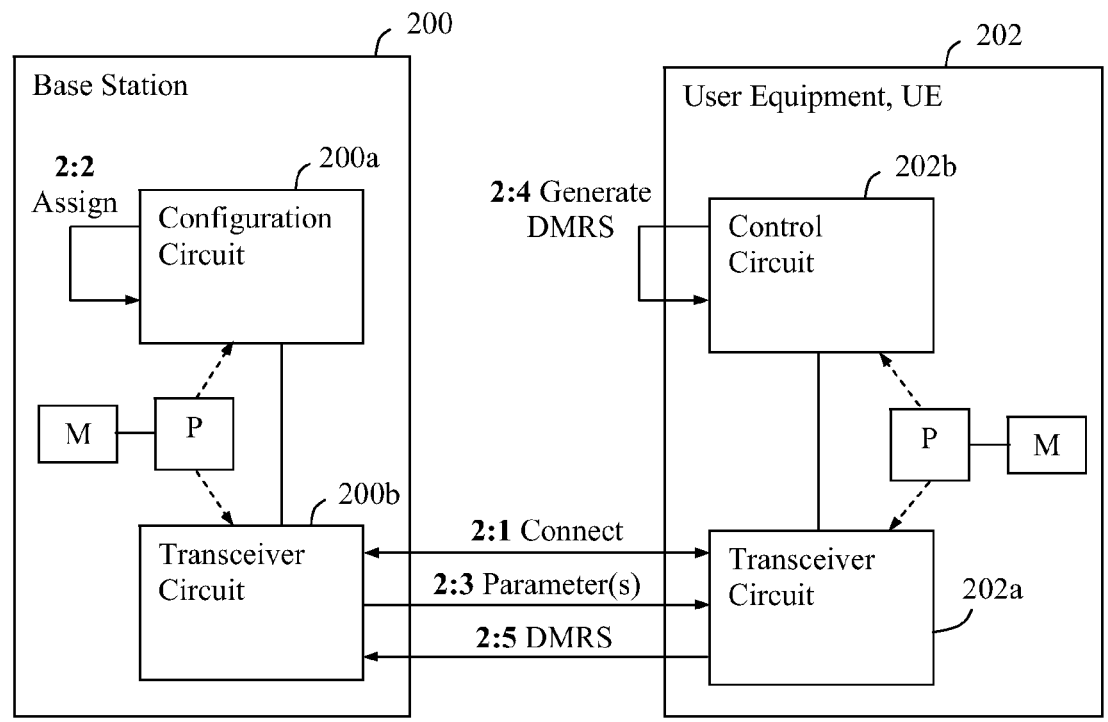
FIG. 2 is a block diagram illustrating a procedure involving a base station and a UE, according to some possible embodiments.

It should be noted that FIG. 2 illustrates various functional circuits in the base station 200 and the UE 202 and the skilled person is able to implement these functional circuits in practice using suitable software and hardware means. Thus, this aspect of the solution is generally not limited to the shown structures of the base station 200 and the UE 202, and the functional units 200a-b and 202a-b may be configured to operate according to any of the features described in this disclosure, where appropriate.

The functional units 200a-b and 202a-b described above can be implemented in the base station 200 and the UE 202, respectively, by means of program modules of a respective computer program comprising code means which, when run by processors "P" causes the base station 200 and UE 202 to perform the above-described actions. The processor P may be a single Central Processing Unit (CPU), or could comprise two or more processing units. For example, each processor P may include general purpose microprocessors, instruction set processors and/or related chips sets and/or special purpose microprocessors such as Application Specific Integrated Circuits (ASICs). Each processor P may also comprise a storage for caching purposes.

Each computer program may be carried by a computer program product in the base station 200 and the UE 202, respectively, in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the base station 200 and the UE 202, respectively.

A procedure in a base station for configuring a demodulation reference signal to be transmitted from a UE, will now be described with reference to the flow chart in FIG. 3 illustrating actions executed in the base station. The base station in this example may be configured basically as described above for base station 200 in FIG. 2. In a first action 300, the base station establishes a connection with the UE, and the dashed box indicates that this action can be assumed completed when the solution starts to be used.

In a further action 302, the base station assigns at least one of a UE-specific base sequence and a UE-specific CS hopping pattern to the UE, basically corresponding to action 2:2 above. The base station then sends at least one configuration parameter to the UE, in another action 304, which configuration parameters indicate the assigned at least one of said UE-specific base sequence and UE-specific CS hopping pattern, basically corresponding to action 2:3 above. Thereby, the UE is enabled to use the received at least one configuration parameter to generate and transmit the demodulation reference signal based on the assigned UE-specific base sequence and/or UE-specific CS hopping pattern.

By using the above procedure, the base station may effectively configure orthogonal DMRSs generated by a plurality of UEs. It has been described above that the base station sends configuration parameters to the UEs to indicate the UE-specific base sequence assignments and/or hopping pattern assignments. For example, the base station may assign a UE-specific hopping pattern to at least one UE independently of its base sequence assignment. As mentioned above, a UE-specific base sequence and/or UE-specific CS hopping pattern may also be assigned to a group of UEs connected to the base station.

This solution allows for some different options. 1) In one option, the base station may assign different UE-specific base sequences to UEs in a group sharing the same CS hopping pattern. In that case, the CS hopping pattern may be cell-specific or UE-specific. 2) In another option, the base station may assign different UE-specific CS hopping patterns to different UE groups, all of which may share the same base sequence. In that case, the base sequence can be cell-specific or UE-specific.

3) In another option, the base station may assign different UE-specific base sequences to different groups of UEs. In that case, the UE groups may use the same or different CS hopping patterns. 4) In another option, the base station may assign different CS hopping patterns to different groups of UEs. In that case, the UE groups may use the same or different base sequences.

5) In another option, the base station may assign both a UE-specific base sequence and a UE-specific CS hopping pattern to a specific UE, e.g. to match the base sequence and CS hopping pattern used by another interfering UE wherein the DMRS transmissions from the UEs can be made orthogonal by assigning different CS and/or OCC.

As indicated by a dashed arrow from FIG. 3 to FIG. 4, action 304 is followed by a procedure in the UE for creating a DMRS for transmission to the base station. This procedure in the UE will now be described with reference to the flow chart in FIG. 4 illustrating actions executed in the UE. The UE in this example may be configured basically as described above for UE 202 in FIG. 2. First, an action 400 illustrates that the UE establishes the connection with the base station, thus basically coinciding with action 300 above and the dashed box indicates that this action as well can be assumed completed when the solution starts to be used in the UE according to the following actions.

A next action 402 indicates that the UE receives the one or more configuration parameters from the base station, which configuration parameters thus indicate at least one of a UE-specific base sequence and a UE-specific CS hopping pattern assigned to the UE, i.e. the one or more configuration parameters sent from the base station in action 304 above. As mentioned above, the UE-specific base sequence and/or UE-specific CS hopping pattern indicated by the configuration parameters may substitute a default cell-specific base sequence and/or a default cell-specific CS hopping pattern which have been configured in the UE. In this action, the base sequence and CS hopping pattern may be jointly signalled to the UE, e.g., as a function of other UE specific parameters.

The UE then determines the assigned UE-specific base sequence and/or UE-specific CS hopping pattern based on the received configuration parameters, in an action 404, and is thus able to generate the demodulation reference signal based on the determined UE-specific base sequence and/or UE-specific CS hopping pattern, in a further action 406 basically corresponding to action 2:4 above. In action 404, the UE may determine the UE-specific base sequence and/or UE-specific CS hopping pattern by using any of equations (1)-(4) as described above. The UE finally transmits the generated demodulation reference signal to the base station, in a last shown action 408, basically corresponding to action 2:5 above.

By using the solution described herein, the channel estimation made by the base station on DMRS transmissions from different UEs can be improved due to reduced interference by achieving orthogonality between the DMRS transmissions, particularly from UEs in different neighbouring cells as well as within the same cell. This will become even more helpful due to densification of cells, increased number of receive antennas, and optional CoMP processing. The solution also allows for flexible MIMO scheduling and orthogonality between DMRSs of the scheduled UEs, even when they belong to different cells. According to Rel-10 LTE, such orthogonality can only be achieved by use of OCC if multiple UEs are configured to use the same base sequence. This solution can thus avoid the necessity of configuring several neighboring cells with the same base sequence, which would result in increased interference even from relatively far away UEs.

While the solution has been described with reference to specific exemplary embodiments, the description is generally only intended to illustrate the inventive concept and should not be taken as limiting the scope of the solution. For example, the terms "base station", "user equipment", "configuration parameters" and "demodulation reference signal" have been used throughout this description, although any other corresponding nodes, functions, and/or parameters could also be used having the features and characteristics described here. The solution is defined by the appended claims.

The invention claimed is:

1. A method in a base station for enabling a user equipment to transmit a configured demodulation reference signal when being served by the base station, the method comprising:

assigning at least one of a UE-specific base sequence and a UE-specific cyclic shift hopping pattern to the user equipment, and sending at least one configuration parameter to the user equipment, said at least one configuration parameters indicating the assigned at least one of said UE-specific base sequence and UE-specific cyclic shift hopping pattern, to enable the user equipment to use said at least one configuration parameters to generate and transmit the demodulation reference signal based on the at least one of said UE-specific base sequence and UE-specific cyclic shift hopping pattern, wherein said at least one configuration parameter comprises at least one of a UE-specific base sequence parameter $\Delta_{SS,UE}$ which the user equipment can use for determining said UE-specific base sequence and a UE-specific cyclic shift hopping parameter $\Delta_{CS,UE}$ which the user equipment can use for determining said UE-specific cyclic shift hopping pattern, and wherein the UE-specific base sequence is determined based on a modified sequence shift pattern $f_{SS,UE}^{PUSCH}$ for a PUSCH channel and the UE-specific cyclic shift hopping pattern is determined based on a modified cyclic shift random generator initialization parameter $c_{initi,UE}$, and wherein said modified sequence shift pattern $f_{SS,UE}^{PUSCH}$ can be determined based on the UE-specific base sequence parameter $\Delta_{SS,UE}$, and said modified cyclic shift random generator initialization parameter $c_{initi,UE}$ can be determined based on the UE-specific cyclic shift hopping parameter $\Delta_{CS,UE}$.

2. The method according to claim 1, wherein said at least one of a UE-specific base sequence and a UE-specific cyclic shift hopping pattern substitutes at least one of a default cell-specific base sequence and a default cell-specific cyclic shift hopping pattern configured in the user equipment.

3. The method according to claim 1, wherein the modified sequence shift pattern $f_{SS,UE}^{PUSCH}$ and the modified cyclic shift random generator initialization parameter $c_{initi,UE}$ are determined as:

$$f_{SS,UE}^{PUSCH}=(f_{SS}^{PUCCH}+\Delta_{SS}+\Delta_{SS,UE}) \bmod 30, \text{ and}$$

$$c_{initi,UE}=\text{floor}(N_{ID}^{cell}/30)*2^5+(f_{SS}^{PUSCH}+\Delta_{CS,UE}) \bmod 30,$$

where $\Delta_{SS}$ is a predefined cell-specific parameter, $f_{SS}^{PUSCH}$ is a default sequence shift pattern for a PUSCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

4. The method according to claim 1, wherein the modified sequence shift pattern $f_{SS,UE}^{PUSCH}$ and the modified cyclic shift random generator initialization parameter $c_{initi,UE}$ are determined as:

$$f_{SS,UE}^{PUSCH}=(f_{SS}^{PUCCH}+\Delta_{SS,UE}) \bmod 30, \text{ and}$$

$$c_{initi,UE}=\text{floor}(N_{ID}^{cell}/30)*2^5+\Delta_{CS,UE},$$

where $f_{SS}^{PUCCH}$ is a default sequence shift pattern for a PUCCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

5. The method according to claim 1, wherein Multiple-Input-Multiple Output, MIMO, is employed for receiving at least two data stream layers from the user equipment, and at least one of said UE-specific base sequence and said UE-specific cyclic shift hopping pattern is assigned to each of the at least two data stream layers.

6. The method according to claim 1, wherein the at least one of a UE-specific base sequence and a UE-specific cyclic shift hopping pattern are assigned to a group of user equipments connected to the base station.

7. A base station adapted to enable a user equipment to transmit a configured demodulation reference signal when being served by the base station, the base station comprising:
a configuration circuit adapted to assign at least one of a UE-specific base sequence and a UE-specific cyclic shift hopping pattern to the user equipment, and a transceiver circuit adapted to send at least one configuration parameter to the user equipment, said at least one configuration parameters indicating the assigned at least one of said UE-specific base sequence and UE-specific cyclic shift hopping pattern, to enable the user equipment to use said at least one configuration parameters to generate and transmit the demodulation reference signal based on the at least one of said UE-specific base sequence and UE-specific cyclic shift hopping pattern, wherein said at least one configuration parameter comprises at least one of a UE-specific base sequence parameter $\Delta_{SS,UE}$ which the user equipment can use for determining said UE-specific base sequence and a UE-specific cyclic shift hopping parameter $\Delta_{CS,UE}$ which the user equipment can use for determining said UE-specific cyclic shift hopping pattern, and wherein the UE-specific base sequence is determined based on a modified sequence shift pattern $f_{SS,UE}^{PUSCH}$ for a PUSCH channel and the UE-specific cyclic shift hopping pattern is determined based on a modified cyclic shift random generator initialization parameter $c_{initi,UE}$, and wherein said modified sequence shift pattern $f_{SS,UE}^{PUSCH}$ can be determined based on the UE-specific base sequence parameter $\Delta_{SS,UE}$, and said modified cyclic shift random generator initialization parameter $c_{initi,UE}$ can be determined based on the UE-specific cyclic shift hopping parameter $\Delta_{CS,UE}$.

8. The base station according to claim 7, wherein said at least one of a UE-specific base sequence and a UE-specific cyclic shift hopping pattern substitutes at least one of a default cell-specific base sequence and a default cell-specific cyclic shift hopping pattern configured in the user equipment.

9. The base station according to claim 7, wherein the modified sequence shift pattern $f_{SS,UE}^{PUSCH}$ and the modified cyclic shift random generator initialization parameter $c_{initi,UE}$ are determined as:

$$f_{SS,UE}^{PUSCH}=(f_{SS}^{PUCCH}+\Delta_{SS}+\Delta_{SS,UE}) \bmod 30, \text{ and}$$

$$c_{initi,UE}=\text{floor}(N_{ID}^{cell}/30)*2^5+(f_{SS}^{PUSCH}+\Delta_{CS,UE}) \bmod 30,$$

where $\Delta_{SS}$ is a predefined cell-specific parameter, $f_{SS}^{PUSCH}$ is a default sequence shift pattern for a PUSCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

10. The base station according to claim 7, wherein the modified sequence shift pattern $f_{SS,UE}^{PUSCH}$ and the modified cyclic shift random generator initialization parameter $c_{initi,UE}$ are determined as:

$$f_{SS,UE}^{PUSCH}=(f_{SS}^{PUCCH}+\Delta_{SS,UE}) \bmod 30, \text{ and}$$

$$c_{initi,UE}=\text{floor}(N_{ID}^{cell}/30)*2^5+\Delta_{CS,UE},$$

where $f_{SS}^{PUCCH}$ is a default sequence shift pattern for a PUCCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

11. The base station according to claim 7, wherein Multiple-Input-Multiple Output, MIMO, is employed for receiving at least two data stream layers from the user equipment, and at least one of said UE-specific base sequence and said UE-specific cyclic shift hopping pattern is assigned to each of the at least two data stream layers.

12. The base station according to claim 7, wherein the at least one of a UE-specific base sequence and a UE-specific cyclic shift hopping pattern are assigned to a group of user equipments connected to the base station.

13. A method in a user equipment for creating a demodulation reference signal for transmission when being served by a base station, the method comprising:
receiving at least one configuration parameter from the base station, said at least one configuration parameters indicating at least one of a UE-specific base sequence and a UE-specific cyclic shift hopping pattern, wherein said at least one configuration parameter comprises at least one of a UE-specific base sequence parameter $\Delta_{SS,UE}$ which is used for determining said UE-specific base sequence and a UE-specific cyclic shift hopping parameter $\Delta_{CS,UE}$ which is used for determining said UE-specific cyclic shift hopping pattern, and wherein the UE-specific base sequence is determined based on a modified sequence shift pattern $f_{SS,UE}^{PUSCH}$ for a PUSCH channel and the UE-specific cyclic shift hopping pattern is determined based on a modified cyclic shift random generator initialization parameter $c_{initi,UE}$, and wherein said modified sequence shift pattern $f_{SS,UE}^{PUSCH}$ is determined based on the UE-specific base sequence parameter $\Delta_{SS,UE}$, and said modified cyclic shift random generator initialization parameter $c_{initi,UE}$ is determined based on the UE-specific cyclic shift hopping parameter $\Delta_{CS,UE}$,
generating the demodulation reference signal based on the at least one of the UE-specific base sequence and the UE-specific cyclic shift hopping pattern, and
transmitting the generated demodulation reference signal.

14. The method according to claim 13, wherein said at least one of a UE-specific base sequence and a UE-specific cyclic shift hopping pattern substitutes at least one of a default cell-specific base sequence and a default cell-specific cyclic shift hopping pattern configured in the UE.

15. The method according to claim 13, wherein the modified sequence shift pattern $f_{SS,UE}^{PUSCH}$ and the modified cyclic shift random generator initialization parameter are determined as:

$f_{SS,UE}^{PUSCH}=(f_{SS}^{PUCCH}+\Delta_{SS}+\Delta_{SS,UE})\bmod 30$, and $c_{initi,UE}=\mathrm{floor}(N_{ID}^{cell}/30)*2^5+(f_{SS}^{PUSCH}+\Delta_{CS,UE})\bmod 30$, where $\Delta_{SS}$ is a predefined cell-specific parameter, $f_{SS}^{PUSCH}$ is a default sequence shift pattern for a PUSCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

16. The method according to claim 13, wherein the modified sequence shift pattern $f_{SS,UE}^{PUSCH}$ and the modified cyclic shift random generator initialization parameter $c_{initi,UE}$ are determined as:

$f_{SS,UE}^{PUSCH}=(f_{SS}^{PUCCH}+\Delta_{SS,UE})\bmod 30$, and $c_{initi,UE}=\mathrm{floor}(N_{ID}^{cell}/30)*2^5+\Delta_{CS,UE}$, where $f_{SS}^{PUCCH}$ is a default sequence shift pattern for a PUCCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

17. The method according to claim 13, wherein Multiple-Input-Multiple Output, MIMO, is employed for sending at least two data stream layers to the base station, and at least one of said UE-specific base sequence and said UE-specific cyclic shift hopping pattern has been assigned to each of the at least two data stream layers.

18. A user equipment adapted to create a demodulation reference signal for transmission when being served by a base station, the user equipment comprising:
a transceiver circuit adapted to receive at least one configuration parameter from the base station, said at least one configuration parameters indicating at least one of a UE-specific base sequence and a UE-specific cyclic shift hopping pattern, wherein said at least one configuration parameter comprises at least one of a UE-specific base sequence parameter $\Delta_{SS,UE}$ which is used for determining said UE-specific base sequence and a UE-specific cyclic shift hopping parameter $\Delta_{CS,UE}$ which is used for determining said UE-specific cyclic shift hopping pattern, and wherein the UE-specific base sequence is determined based on a modified sequence shift pattern $f_{SS,UE}^{PUSCH}$ for a PUSCH channel and the UE-specific cyclic shift hopping pattern is determined based on a modified cyclic shift random generator initialization parameter $c_{initi,UE}$, and
a control circuit adapted to generate the demodulation reference signal according to the at least one of the UE-specific base sequence and the UE-specific cyclic shift hopping pattern, and wherein the control circuit is further adapted to determine said modified sequence shift pattern $f_{SS,UE}^{PUSCH}$ based on the UE-specific base sequence parameter $\Delta_{SS,UE}$ and to determine said modified cyclic shift random generator initialization parameter $c_{initi,UE}$ based on the UE-specific cyclic shift hopping parameter $\Delta_{CS,UE}$,
wherein the transceiver circuit is further adapted to transmit the generated demodulation reference signal.

19. The user equipment according to claim 18, wherein said at least one of a UE-specific base sequence and a UE-specific cyclic shift hopping pattern substitutes at least one of a default cell-specific base sequence and a default cell-specific cyclic shift hopping pattern configured in the user equipment.

20. The user equipment according to claim 18, wherein the control circuit is further adapted to determine the modified sequence shift pattern $f_{SS,UE}^{PUSCH}$ and the modified cyclic shift random generator initialization parameter $c_{initi,UE}$ as:

$f_{SS,UE}^{PUSCH}=(f_{SS}^{PUCCH}+\Delta_{SS}+\Delta_{SS,UE})\bmod 30$, and $c_{initi,UE}=\mathrm{floor}(N_{ID}^{cell}/30)*2^5+(f_{SS}^{PUSCH}+\Delta_{CS,UE})\bmod 30$, where $\Delta_{SS}$ is a predefined cell-specific parameter, $f_{SS}^{PUSCH}$ is a default sequence shift pattern for a PUSCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

21. The user equipment according to claim 18, wherein the control circuit is further adapted to determine the modified sequence shift pattern $f_{SS,UE}^{PUSCH}$ and the modified cyclic shift random generator initialization parameter $c_{initi,UE}$ as:

$f_{SS,UE}^{PUSCH}=(f_{SS}^{PUCCH}+\Delta_{SS,UE})\bmod 30$, and $c_{initi,UE}=\mathrm{floor}(N_{ID}^{cell}/30)*2^5+\Delta_{CS,UE}$, where $f_{SS}^{PUCCH}$ is a default sequence shift pattern for a PUCCH channel, 30 is the number of available base sequences, each of the configuration parameters $\Delta_{SS,UE}$ and $\Delta_{CS,UE}$ has a range of 0 . . . 29, and $N_{ID}^{cell}$ is the cell ID for a cell N.

22. The user equipment according to claim 18, wherein Multiple-Input-Multiple Output, MIMO, is employed for sending at least two data stream layers to the base station, and at least one of said UE-specific base sequence and said UE-specific cyclic shift hopping pattern has been assigned to each of the at least two data stream layers.

* * * * *

UNITED STATES PATENT AND TRADEMARK OFFICE
CERTIFICATE OF CORRECTION

PATENT NO. : 8,750,230 B2
APPLICATION NO. : 13/389712
DATED : June 10, 2014
INVENTOR(S) : Sorrentino Page 1 of 1

It is certified that error appears in the above-identified patent and that said Letters Patent is hereby corrected as shown below:

In the specification

Column 4, Line 61, delete "$f_{SS,UE}^{PUSCH}=(f_{SS}^{PUCCH}+\Delta_{SS}\Delta_{SS,UE}) \bmod 30$," and insert -- $f_{SS,UE}^{PUSCH}=(f_{SS}^{PUCCH}+\Delta_{SS}+\Delta_{SS,UE}) \bmod 30$, --, therefor.

Column 5, Line 9, delete "$c_{initi,UE}=floor(N_{ID}^{cell}/30)*2^5\Delta_{CS,UE}$," and insert -- $c_{initi,UE}=floor(N_{ID}^{cell}/30)*2^5+\Delta_{CS,UE}$," --, therefor.

Column 5, Line 47, delete "above, It" and insert -- above, it --, therefor.

Column 8, Line 49, delete "$f_{SS}^{PUSCH}$," and insert -- $f_{SS}^{PUCCH}$ --, therefor.

Column 9, Line 64, delete "parameters as" and insert -- parameters --, therefor.

In the claims

Column 12, Line 63, Claim 1, delete "parameters" and insert -- parameter --, therefor.

Column 12, Line 67, Claim 1, delete "parameters" and insert -- parameter --, therefor.

Column 14, Line 3, Claim 7, delete "parameters" and insert -- parameter --, therefor.

Column 14, Line 6, Claim 7, delete "parameters" and insert -- parameter --, therefor.

Column 15, Line 7, Claim 13, delete "parameters" and insert -- parameter --, therefor.

Column 15, Line 38, Claim 15, delete "parameter" and insert -- parameter $c_{initi,UE}$ --, therefor.

Column 16, Line 6, Claim 18, delete "parameters" and insert -- parameter --, therefor.

Column 16, Line 26, Claim 18, delete "$\Delta_{SS,UE}$" and insert -- $\Delta_{SS,UE}$, --, therefor.

Signed and Sealed this
Thirteenth Day of October, 2015

Michelle K. Lee
*Director of the United States Patent and Trademark Office*